United States Patent [19]
Carr et al.

[11] Patent Number: 5,851,393
[45] Date of Patent: *Dec. 22, 1998

[54] SCREEN ASSEMBLY

[75] Inventors: Brian S. Carr, Ft. Wright; Ari M. Hukki, Edgewood, both of Ky.

[73] Assignee: Emerson Electric Co., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 557,201

[22] Filed: Nov. 14, 1995

[51] Int. Cl.$^6$ .................................................. B01D 29/05
[52] U.S. Cl. ...................... 210/489; 210/499; 209/319; 209/399; 209/403; 29/896.62
[58] Field of Search ..................... 209/319, 399, 209/401, 403; 29/896.6, 896.62; 210/489, 499, 346, 486, 487, 488

[56] References Cited

U.S. PATENT DOCUMENTS

| | | | |
|---|---|---|---|
| 2,455,383 | 12/1948 | Pickard | 209/323 |
| 3,214,314 | 10/1965 | Rowbottam | 156/160 |
| 3,261,469 | 7/1966 | Wehner | 209/325 |
| 4,028,230 | 6/1977 | Rosenblum | 209/403 |
| 4,526,682 | 7/1985 | Wallace | 209/337 |
| 4,575,421 | 3/1986 | Derrick et al. | 209/397 |
| 4,728,422 | 3/1988 | Bailey | 210/314 |
| 4,762,610 | 8/1988 | Freissle | 210/499 |
| 4,861,462 | 8/1989 | Lehmann et al. | 209/269 |
| 5,039,412 | 8/1991 | Marsh | 210/499 |
| 5,047,148 | 9/1991 | Arai | 210/499 |
| 5,385,669 | 1/1995 | Leone, Sr. | 210/499 |
| 5,417,859 | 5/1995 | Bakula | 210/499 |
| 5,587,077 | 12/1996 | Aaltonen et al. | 210/499 |

FOREIGN PATENT DOCUMENTS

| | | |
|---|---|---|
| 31 14573 | 4/1987 | Germany. |
| 9415723 | 7/1994 | WIPO. |
| WO 94/23849 | 10/1994 | WIPO. |

*Primary Examiner*—W. L. Walker
*Attorney, Agent, or Firm*—Lyon & Lyon LLP

[57] ABSTRACT

Screen assemblies having a plurality of supports assembled with peripheral screen frames with screen cloth extending fully over the assemblies. The supports are assembled with each other and with the screen frame using dovetail mechanisms. Each support includes a cell structure having walls defining open cells. The walls have an elongate cross section to provide thickness to the structure. A thin support grid is integrally formed with the walls with the top of the support grid and the top of the walls lying in the same plane. The top of the surrounding frame also lies in this plane. The walls and the frame each have energy directors for ultrasonic bonding to the screen cloth laid over the assembly. The lower edge of the walls and of the screen frame also lie within a plane and have energy directors for receipt of a larger mesh closure screen to retain self-cleaning sliders or elements within the cells. The cells have no straight edges in plan. The support grid is defined by elongate elements each having a rounded upper surface to reduce stress on the screen cloth. The screen cloth may be lightly tensioned and can be of polymeric material as well as of metal such as stainless.

36 Claims, 12 Drawing Sheets

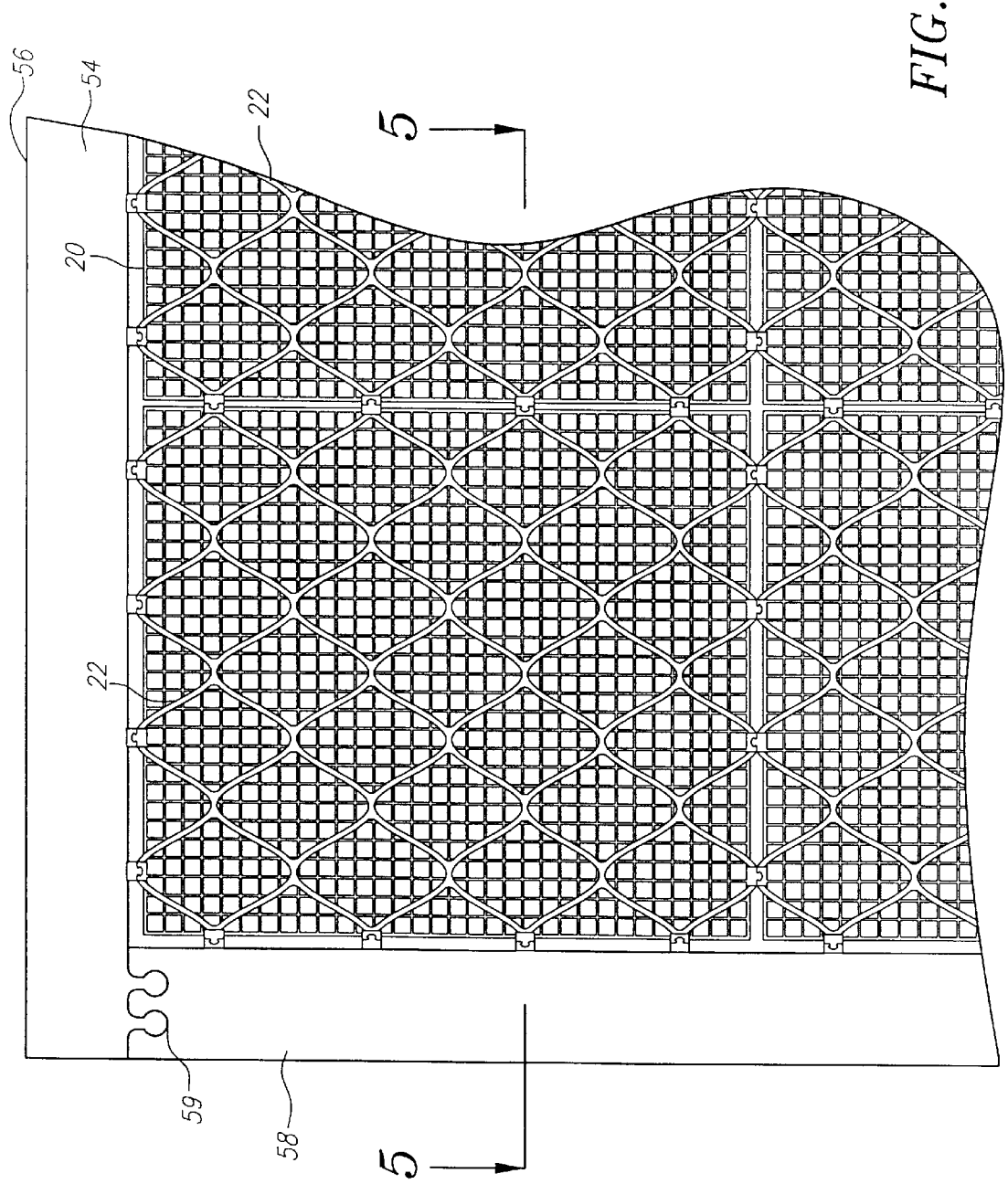

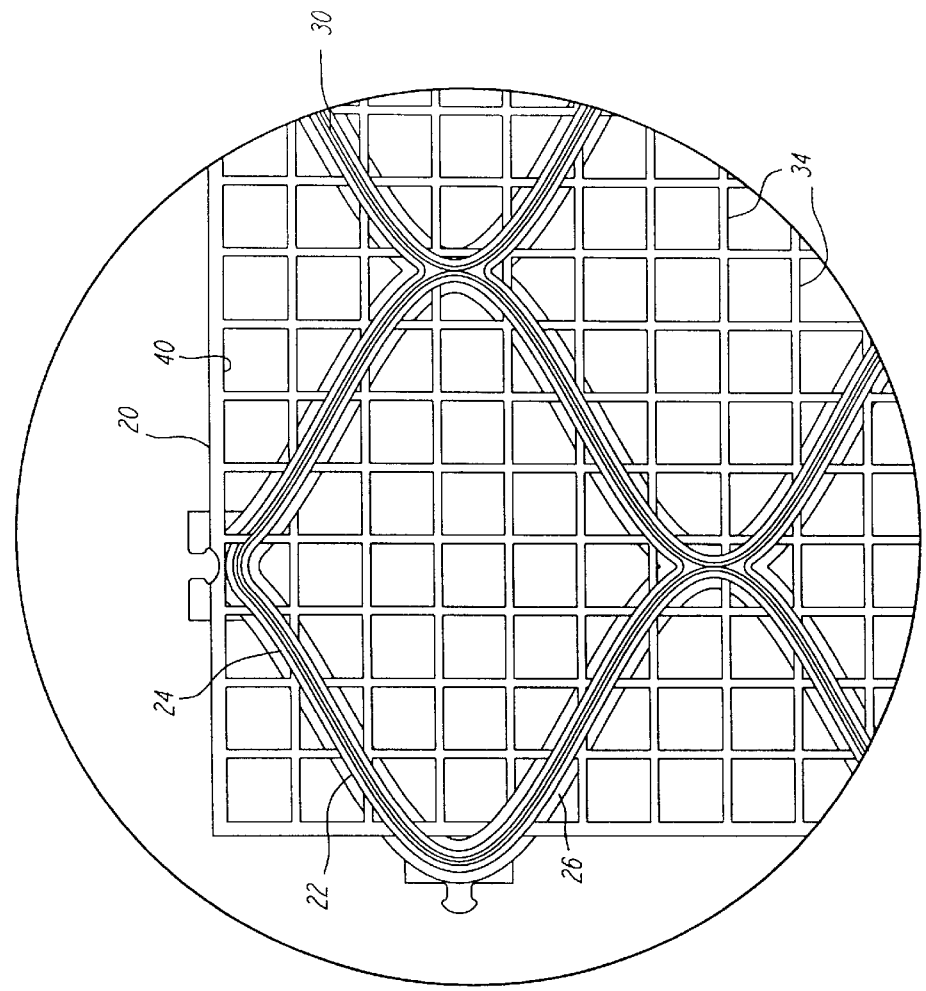
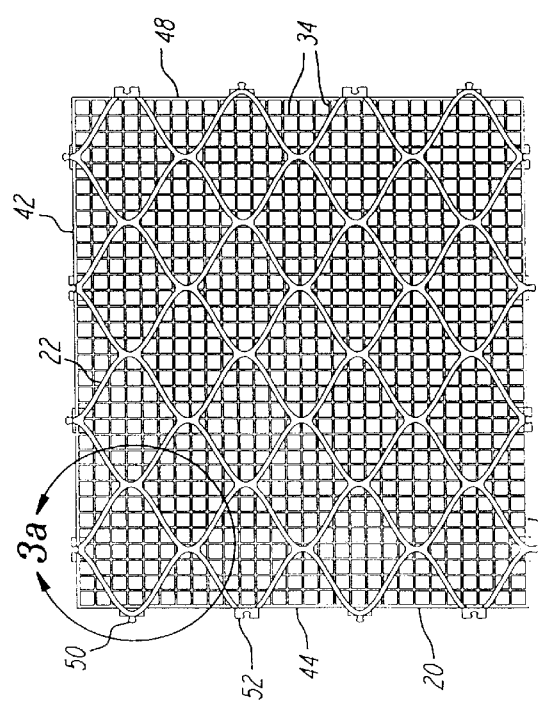

SCREEN ASSEMBLY

BACKGROUND OF THE INVENTION

The field of the present invention is screen structures for vibratory separators.

Screening systems have long been known which employ vibrated screens for the separation of solids of varying sizes or solids from liquids. The vibration may range from subsonic frequencies with large amplitudes to ultrasonic frequencies with small amplitudes. Combinations of such frequencies have also been used. Screens typically are positioned within a vibratory separator housing and held in place while either the frame structure associated with the screen is vibrated or vibrating probes extend to the screen itself.

Screens used in such vibratory equipment typically include a rigid frame, either rectangular or circular, with screen cloth highly tensioned and bonded, welded or clamped to the frame. To insure longevity and hold up under the loads and other conditions imposed, the screens are typically stainless steel with mesh size ranging from microns to parts of an inch.

High tensioning of screen cloth provides for transmission of vibration across the screen for separation. However, such tensioning mandates the need for certain materials such as stainless steel which can resist the tension necessary to keep a screen taut. With the screens highly tensioned, heat cycling can result in loss of tension and sagging of the screen cloth. Under these circumstances, energy cannot be properly transferred to the screen cloth for separation. Further, under some circumstances, polymeric materials would be preferred to provide an inert environment for the materials being screened. However, polymeric screen cloth cannot be highly tensioned.

Perforated plates and course screen cloth have been used in various combinations with fine mesh screen cloth. Layers of fine mesh screen cloth placed in juxtaposition are known to vibrate so as to impact on one another to reduce blinding. Where one or more layers of fine mesh screen cloth are supported by course screen cloth and/or plates, the overall tension of the fine mesh may be reduced. Thus, supported screen systems allow for the use of polymeric material. However, open screen area is also reduced by such support devices such that there can be significant blockage of flow.

A further difficulty with multiple layers of screen cloth and with supporting structure is that screens have rough surfaces resulting from the intersections of screen wires in the weave. These "knuckles" tend to have an adverse effect on adjacent layers, particularly polymeric layers. Further, straight edges on supporting plates and the like can result in failure at the edge where screen cloth can repeatedly impact and bend.

SUMMARY OF THE INVENTION

The present invention is directed to a screen assembly for maximizing throughput and providing support allowing use of lightly tensioned screen cloth. The supported screen cloth need only use light tensioning to maintain flatness.

In a first, separate aspect of the present invention, the screen assembly may include a thin support grid including rounded upper surfaces to reduce screen stress and increase throughput.

In a second, separate aspect of the present invention, the screen assembly may include a cell structure with a mounting surface coplanar with a thin support grid underlying a screen cloth.

In a third, separate aspect of the present invention, the screen assembly may include a cell structure having walls defining open cells. The walls extend in elongate cross section to provide structural rigidity to the screen assembly. The cell structure may be arranged such that the mounting surface has no straight edge in plan. This avoids a linear attachment point for the screen cloth making the screen cloth susceptible to greater bending failure. The walls may be sinusoidal in plan to achieve this result.

In a fourth, separate aspect of the present invention, the screen assembly may include a frame extending about the support and providing attachment for the screen cloth.

In a fifth, separate aspect of the present invention, a screen assembly has a frame, screen cloth and a planar support. The planar support includes a cell structure with a mounting surface and open cells extending through the planar support. The cell structure has no straight edge in plan and the cell walls are of substantially uniform width in plan.

In a further, separate aspect of the present invention, a thin support grid may be made up of elongate elements joined end to end with the elongate elements being rounded on their upper surface. The rounding reduces stress loads on the screen cloth and increases throughput. The ridges defined by the rounded sides of the elongate elements combine to define a planar surface upon which the screen cloth rests. Thus, the rough texture of a supporting screen with knuckles at the intersection of screen wires is avoided.

In another, separate aspect of the present invention, the supports may include dovetail mechanisms such that multiple supports can be arranged together. A surrounding frame also employing dovetail mechanisms may be joined with the supports to form a complete supporting structure upon which screen cloth is mounted.

In yet another, separate aspect of the present invention, a supporting grid surface is provided for a self cleaning kit with upstanding cells receiving a screen cloth.

Accordingly, it is an object of the present invention to provide an improved screen assembly. Further objects and advantages will appear hereinafter.

BRIEF DESCRIPTION OF THE DRAWINGS

FIG. 2 is a plan view of a representative portion of the support structure of FIG. 1.

FIG. 3 is a plan view of a single support of the support structure.

DETAILED DESCRIPTION OF THE PREFERRED EMBODIMENTS

Figure 1:
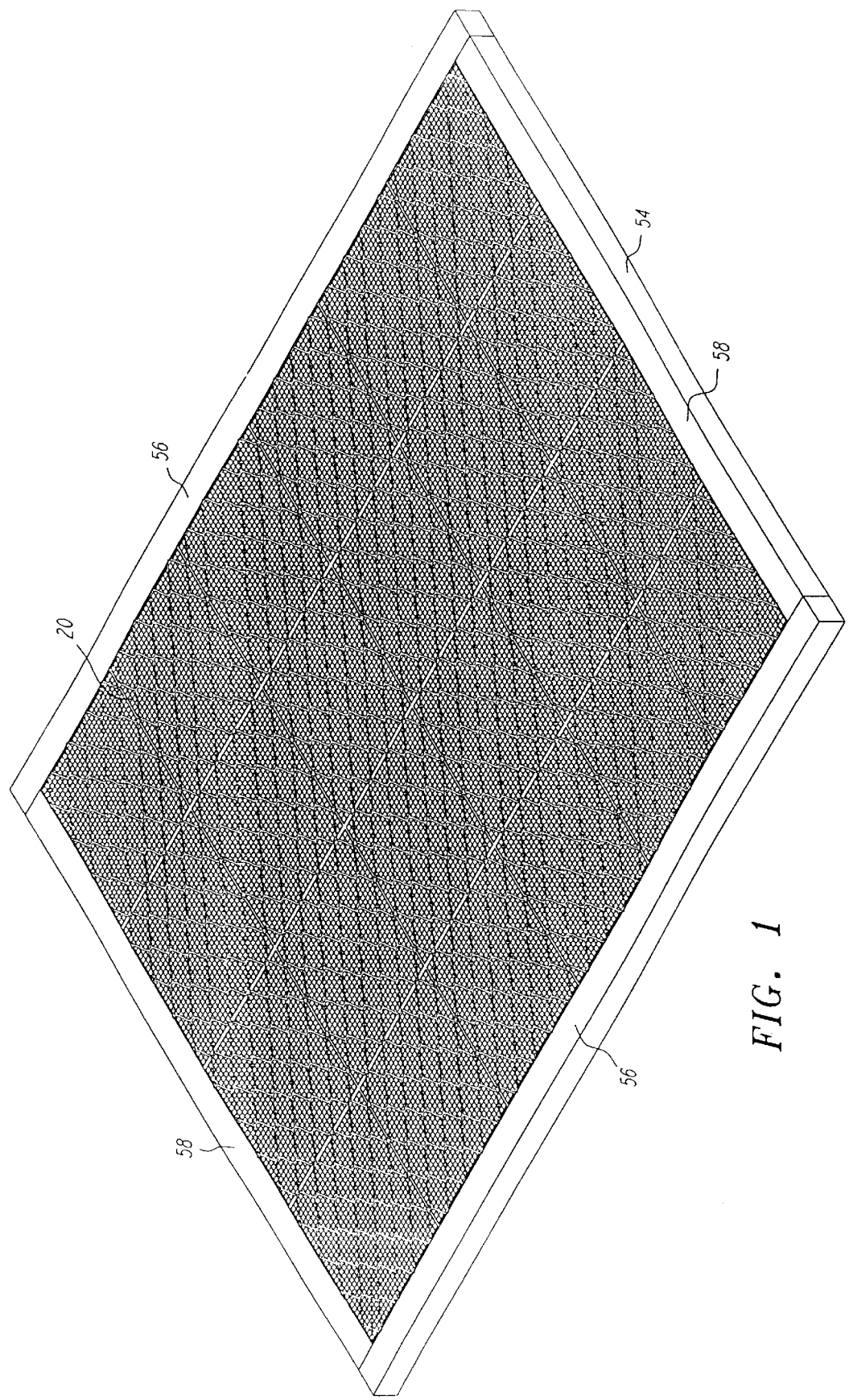
FIG. 1 is a perspective view of the support structure of a screen assembly.
Figure 4:
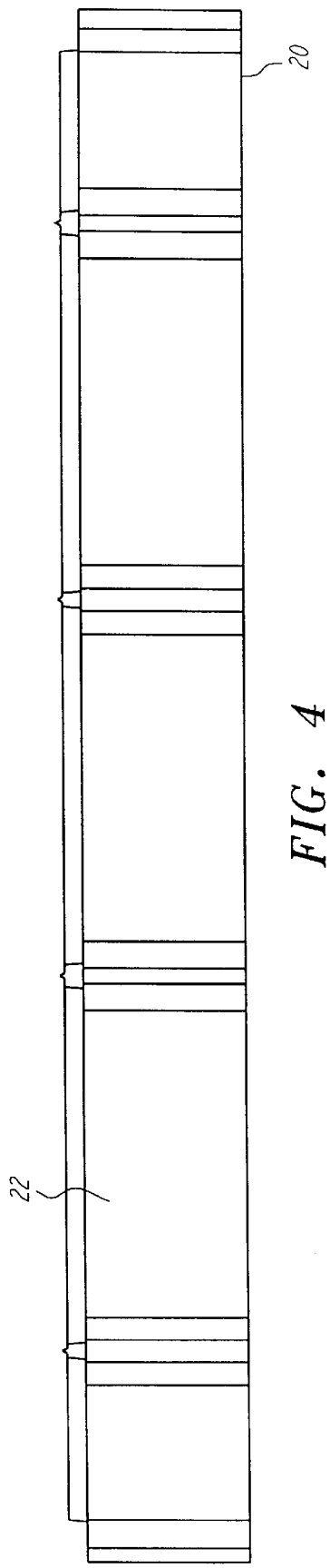
FIG. 4 is a side view of the single panel of FIG. 3.
Figures 5, 5A:
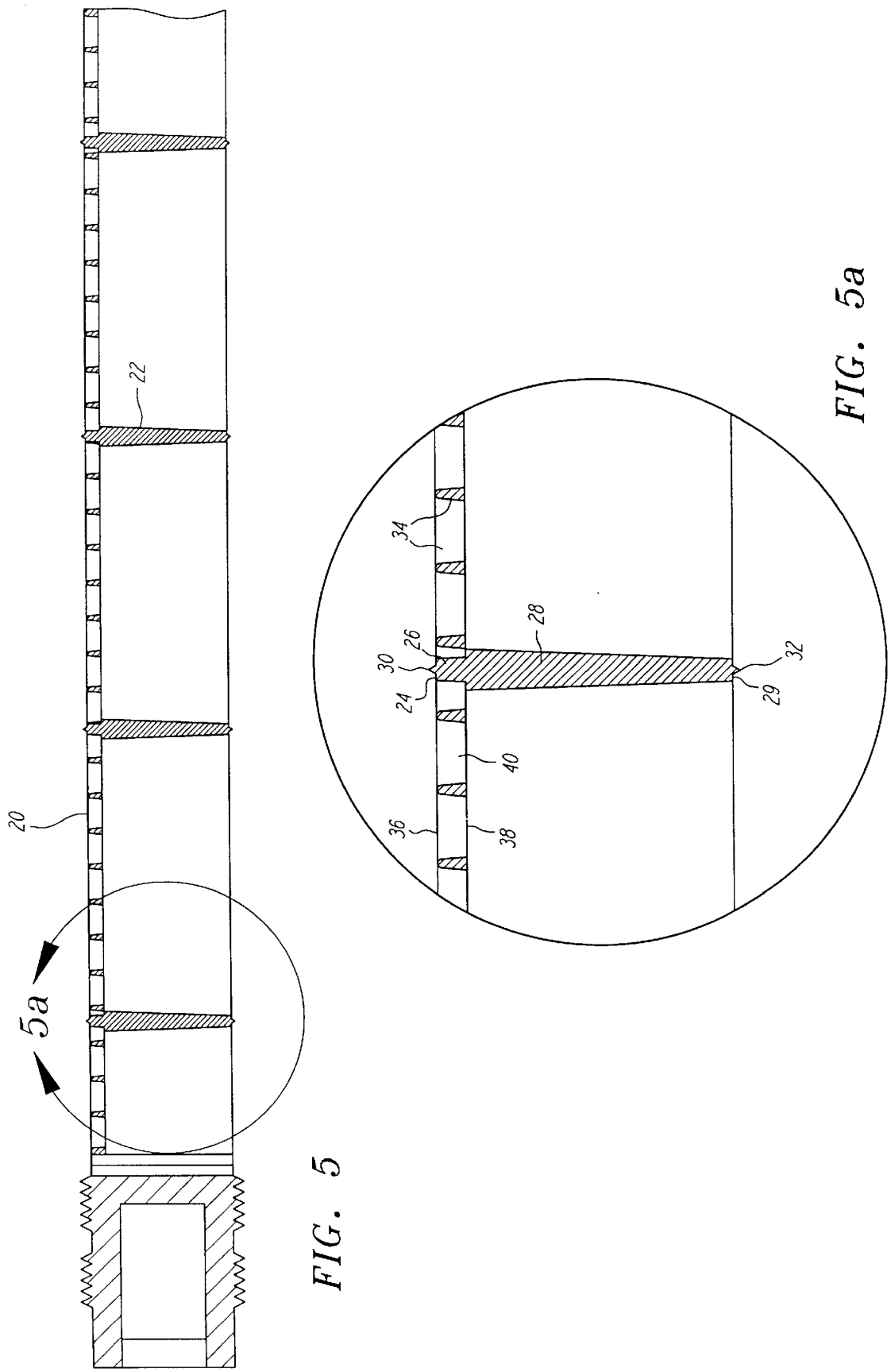
FIG. 5 is a cross-sectional view taken along line 5—5 of FIG. 2.
Figure 6:
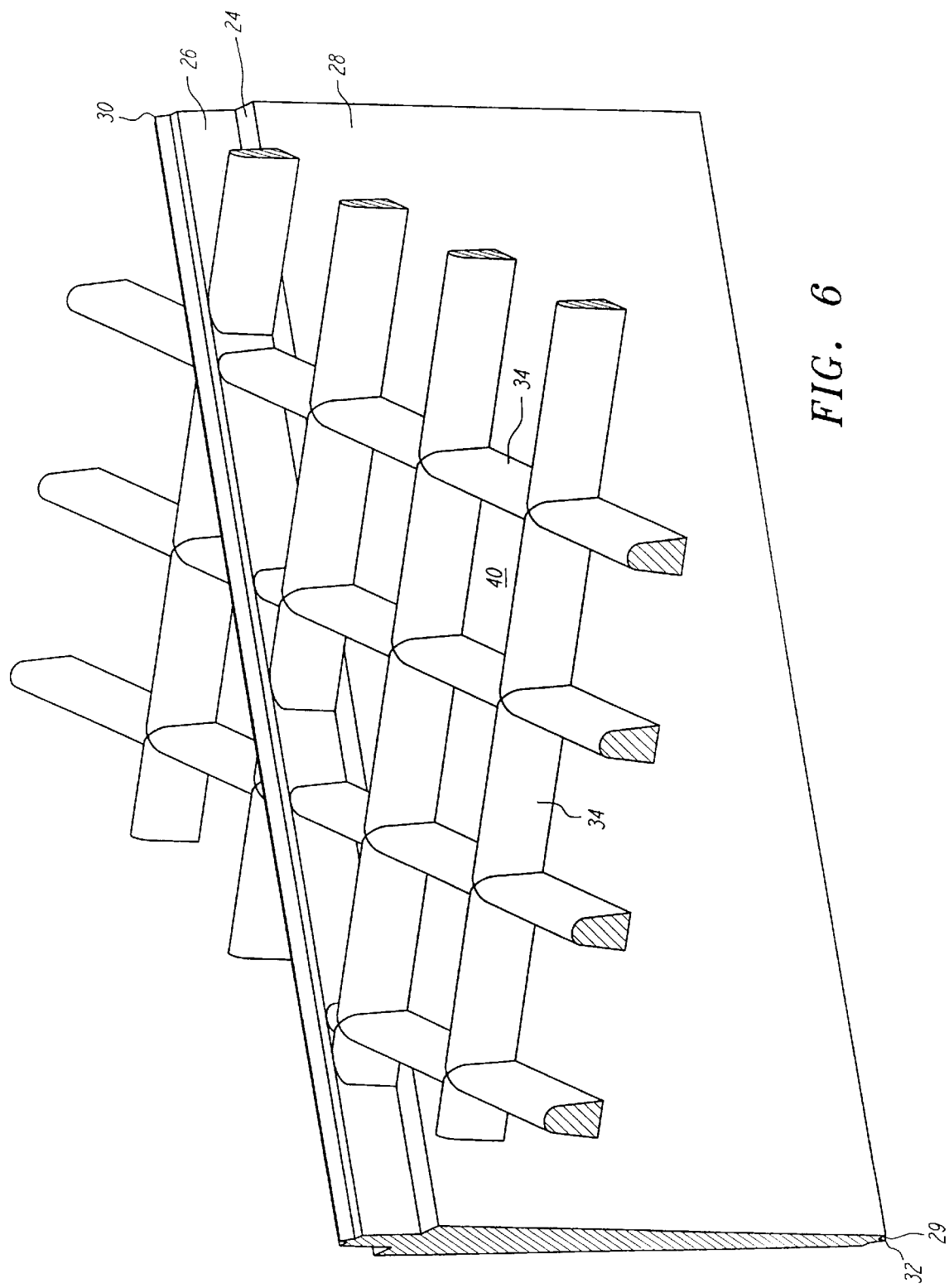
FIG. 6 is a perspective view of detail in FIG. 5.

Turning in detail to the drawings, FIG. 1 illustrates a support structure of a screen assembly. This structure is made up of several component parts. Supports 20 are arranged and associated together to make a full support body with a frame extending about this body. One support 20 is illustrated in FIGS. 3, 4 and 5. Superimposed patterns of a thin support grid and a cell structure are injection molded to define such a support 20. The separate patterns will be referenced separately for ease of description. However, as the entire structure 20 is injection molded as one piece, there is no physical separation between superimposed patterns. The cell structure is defined by walls 22. The walls 22 are shown in plan to extend in sinusoidal patterns across the structure 20. At the peaks having common tangents of each sinusoidal pattern, the walls 22 are mutually joined. Thus, a pattern of open cells is defined by these walls 22 with the cells extending normal to the plane of the structure 20 for material flow therethrough.

The walls 22 are elongate in cross section such that they extend from an upper mounting surface 24 downwardly to provide significant strength in bending. Some draft is provided in the upper portion 26 for ease of molding. The lower portion 28 of each wall 22 is somewhat triangularly shaped from a widest portion of 0.130" downwardly to a lower surface 29 like the upper mounting surface 24 of the upper portion 26. The shoulder defined at the part line of the generating mold in the cross section of the walls 22 is simply for molding convenience and cost.

At the mounting surface 24 on the upper portion 26 and the lower surface 29 of the lower portion 28, energy directors 30 and 32 extend along each wall 20. These energy directors 30 and 32 extend about 0.030" outwardly of the underlying surfaces. They are well known in polymeric fabrication arts to act as weld beads easily fused by an ultrasonic horn for attachment of other elements without a fusing of the supporting structure.

Looking in plan, the sinusoidal patterns of the walls 22 create irregularly shaped cells of roughly two inches in each of the two longest dimensions. The pattern defined in plan by the walls 22 is such that there is no straight edge of the mounting surface 24. The height of the walls in elongate cross section is approximately 1.00" excluding the energy directors 30 and 32.

The thin support grid is shown to be rectilinear with elongate elements 34 attached end to end and running in two directions so as to form the grid pattern. The support grid provides a rounded support surface 36 defining a ridge in elliptical profile. The elliptical profile is defined with the long axis of the ellipse extending parallel to the support surface 36 to provide a broad support and a rounded falling off toward each aperture. This support surface 36 is coincident with the mounting surface 24. Thus, a surface plane is defined which includes the ridges of both the mounting surface 24 and the support surface 36 which will support screen cloth. Each elongate element 34 includes the support surface 36 on one side and a flat surface 38 on the opposite side. A flat surface is preferred for purposes of self-cleaning screen slider systems. The height of the elongate elements 34 from the support surface 36 to the flat surface 38 is about 0.100". The width of the elliptical profile is about 0.030" with a 2° draft extending downwardly therefrom to the flat surface 38 with a width of approximately 0.047". The grid pattern provides for apertures 40 approaching 0.25" square less the thickness of the elongate elements 34. Thus, the apertures 40 are significantly smaller than the cells defined by the walls 22.

Looking to the support 20 in its entirety, the thin support grid pattern defined by the elongate elements 34 in turn defines straight sides 42, 44, 46 and 48 about the periphery of the support 20. The cell structures are arranged such that the walls 22 extend outwardly to these straight sides 42–48 and terminate in fastening mechanisms shown in this embodiment to be tenons 50 or mortises 52. Conveniently, the pattern of these tenons 50 and mortises 52 is such that multiple supports 20 can be assembled together using such a dovetail mechanism. The tenons 50 and mortises 52 are preferably configured for an interference fit. All of these elements described in association with the supports 20 are integrally molded at one time.

Figure 7:
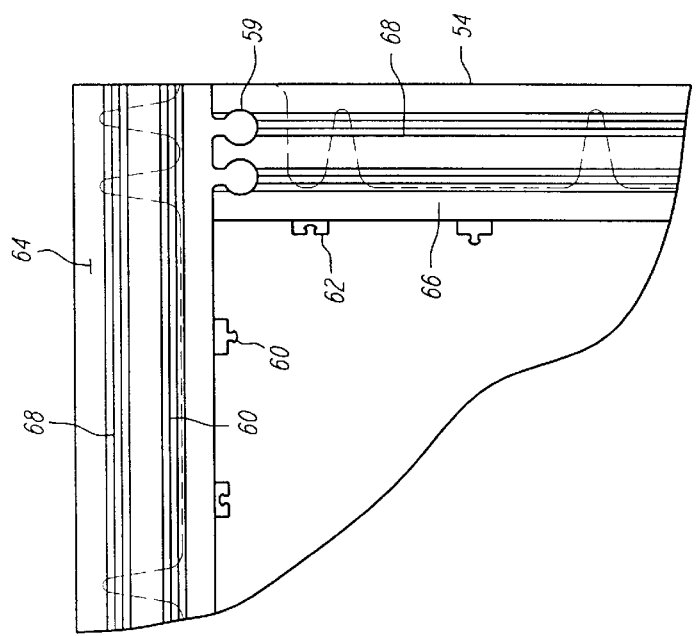
FIG. 7 is the corner detail of the screen frame.
Figure 8:
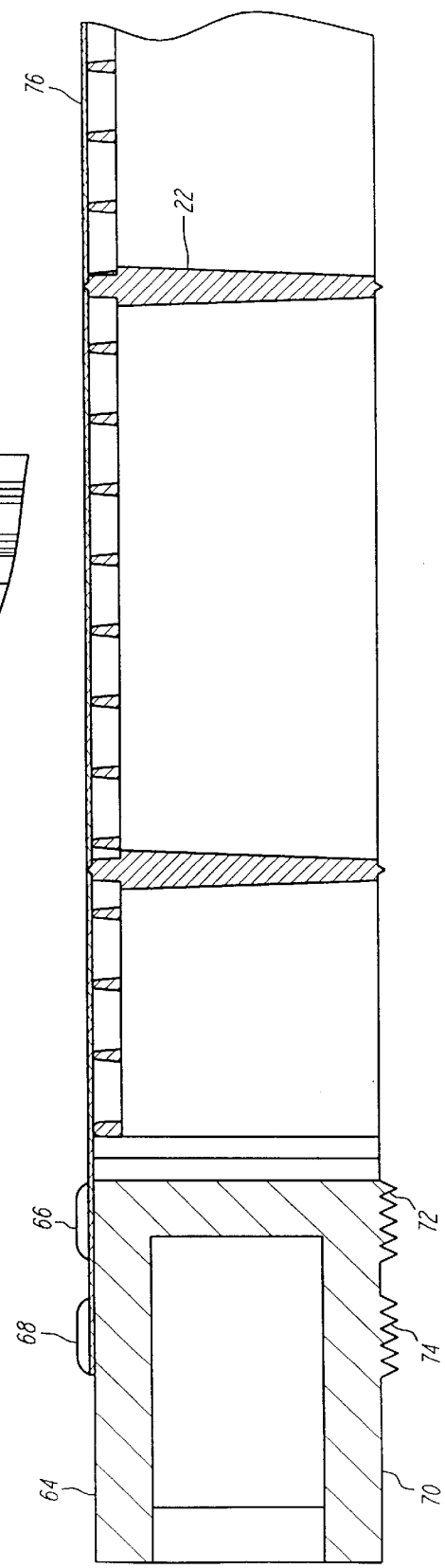
FIG. 8 is a cross-sectional view of a screen assembly using the support structure of FIG. 2 with screen cloth in place.
Figure 9:
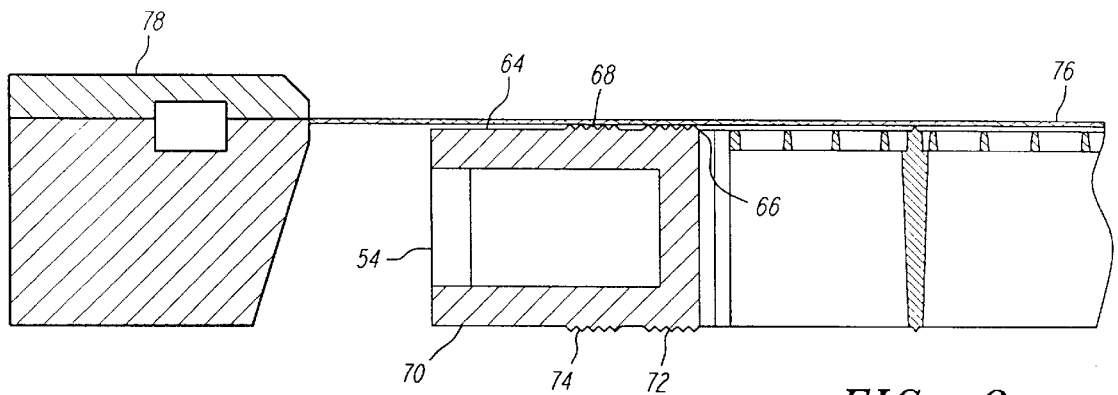
FIGS. 9 through 11 schematically illustrate the process of affixing the screen cloth about its periphery to the screen frame.
Figure 10:
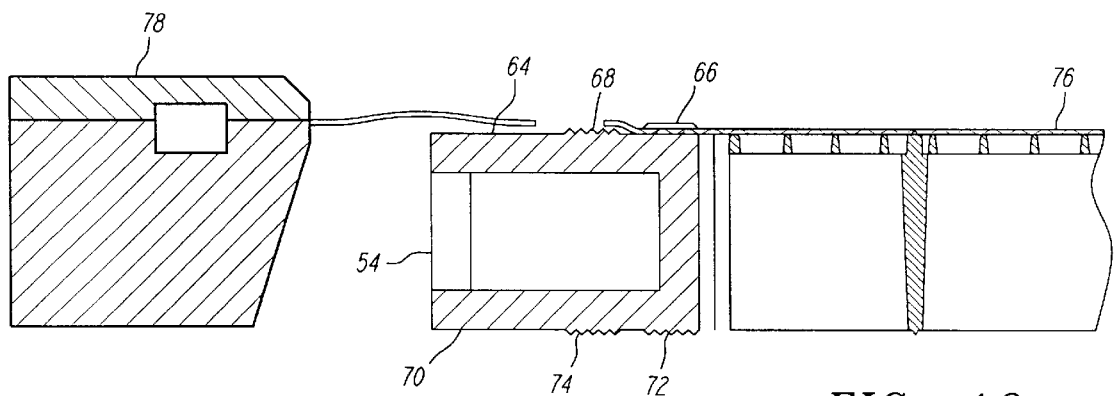
Figure 11:
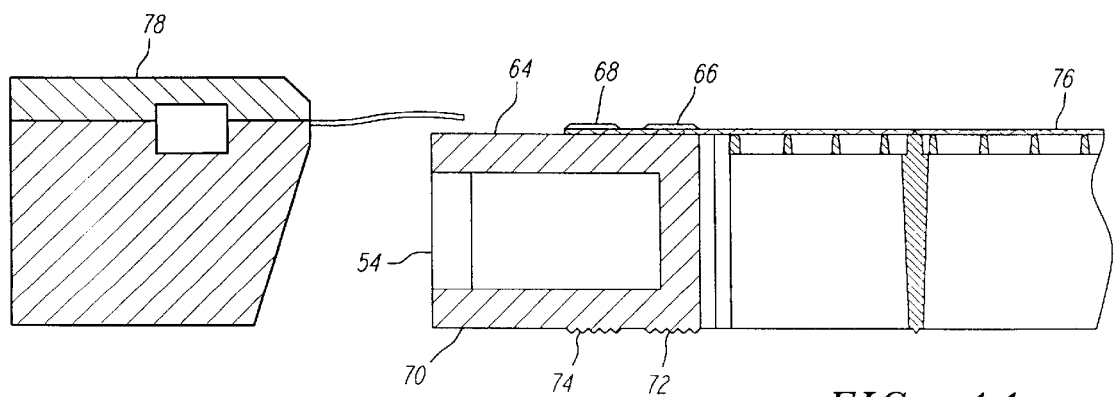

As can be seen in FIG. 1, there are twenty-four supports 20 assembled together to form the screen support section of the screen assembly. Of course, other screen sizes can be achieved through use of more or less of these supports 20. Positioned around these assembled supports 20 is a frame 54. The frame is comprised of two sides 56 and two ends 58. FIG. 7 illustrates the mechanical joint for associating the sides 56 and ends 58 together to form the frame 54. Interlocking integral elements 59 provide an appropriate mechanical fit. Tenons 60 and mortises 62 associated around the inner periphery of the frame 54 associate with the supports 20 in the same way as the supports 20 are mutually held together.

The frame 54 includes an attachment surface 64 which lies in the same plane as the mounting surface 24 and the support surface 36. Two sets of attachment energy directors 66 and 68 are located on the attachment surface 64 fully about the frame 54. The first set 66 is arranged inwardly of the second set 68. The spacing shown between sets is only for convenience. The entire surface or any part thereof may be covered with such directors with the sets only being distinguished by which directors are initially attached and which are subsequently attached to the screen as will be discussed below. A second attachment surface 70 is positioned on the other side of the frame 54. This second attachment surface 70 also includes two sets 72 and 74 of attachment energy directors. With the attachment surface 64 being coplanar with the mounting surface 24, the energy directors 30, 66 and 68 all extend upwardly from the same plane. The same is true of the energy directors 32, 72 and 74 because the thickness of the frame 54 is the same as the height of the walls 22.

It is contemplated that additional structural rigidity may be provided with the assembly. The configuration of such additional structural elements may depend on the frequency of intended vibration. Structural elements may be molded directly into the supports 20. Additional fastening elements may be provided about the periphery of each support 20. External bracing may also or alternatively be employed and affixed to the underside of the screen assembly.

Screen cloth 76 is preferably arranged over the entire screen assembly once the frame 54 has been assembled with the supports 20. Some tension is employed with the screen cloth 76. This tension need not be such that it contributes structural support for loads placed on the screen. Rather, only sufficient tension is needed to cause the screen cloth 76 to remain flat on the mounting and support surfaces 24 and 36. With this much lower tension requirement, polymeric as well as stainless steel screen mesh may be employed. Interstices through the screen mesh provide for the sizing and flow of materials. The interstices are substantially smaller than the apertures 40 in the thin support grid. This is for reasons other than potential clogging of the apertures 40. Rather, to obtain maximum open screen area with a necessary amount of support, a much larger aperture opening in the support grid than that required to avoid blinding is preferred.

The screen cloth 76 extends in the assembly process to tensioning fixtures 78 which hold the screen cloth 76 in low tension. The assembled frame structure is brought up against the screen cloth 76 in this lightly tensioned condition. An ultrasonic horn is then passed over the energy directors 30 and 72. In this way, the screen cloth 76, still tensioned by the tensioning fixtures 78, becomes fixed to the mounting surface of the cell structure by fusing of the plastic of the energy director and becomes affixed to the frame 54 at the inner set 66 of energy directors on the frame 54. The screen may then be cut to define a periphery which lies over the second set 68 of energy directors on the frame 54. The ultrasonic horn is then passed over the outer set 68 to embed the periphery of the screen cloth 76. The resulting screen assembly may then be considered complete.

Figure 12:
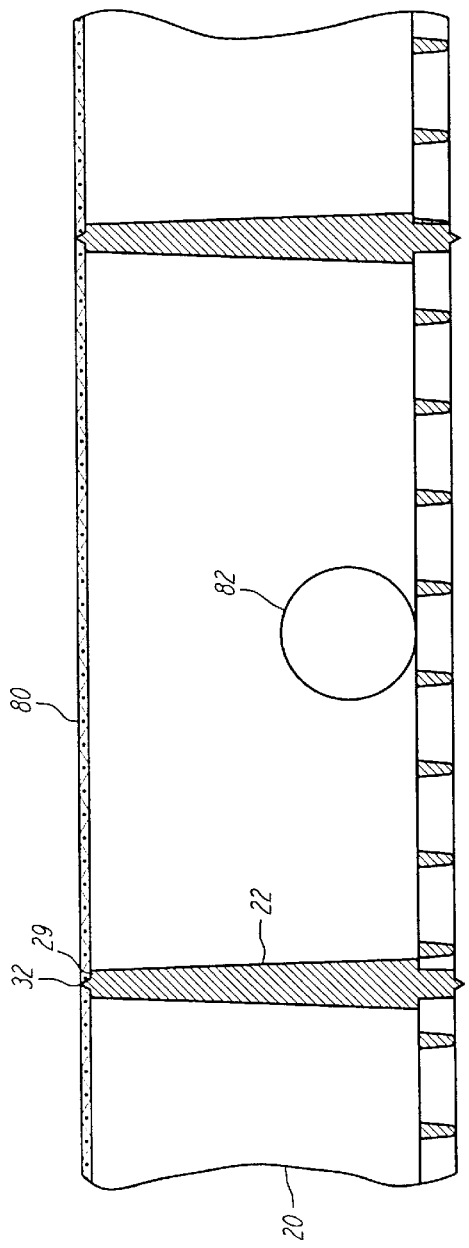
FIG. 12 is a cross-sectional view of a screen assembly using the support structure to enclose a self cleaning kit.
Figure 13:
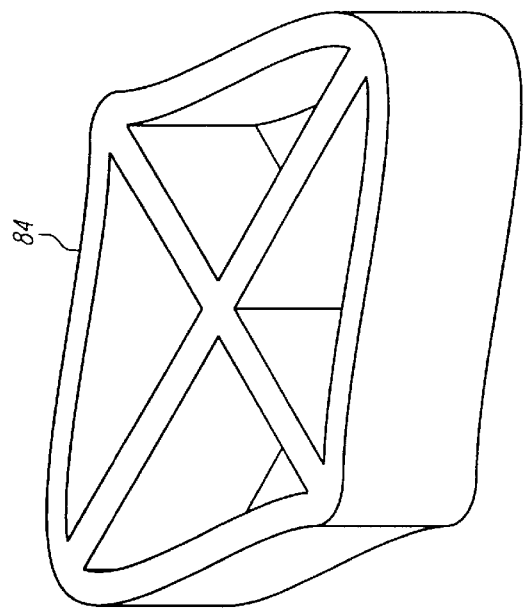
FIG. 13 is a perspective view of a slider which may be used in place of the balls in the device of FIG. 12.

FIG. 12 illustrates a self-cleaning screen kit associated with the support. The support 20 is inverted and screen cloth 80 is tensioned and affixed to the ends 29 of the walls 22 using the energy directors 32. The sets 72 and 74 of energy directors on the frame 54 receive the screen as described with the energy directors 66 and 68. An ultrasonic horn is again used to complete the attachment of the screen cloth 80 to the frame 54 and walls 22 of the supports 20. Sliders or other self-cleaning elements are first positioned within the cells so that they may impact against the underside of the screen cloth 80. In FIG. 12, the self-cleaning elements 82 are balls which bounce against the underside of the screen cloth 80. FIG. 13 shows another slider 84 which is shaped to fit within the cells and to slide to within the corners.

Figure 14:
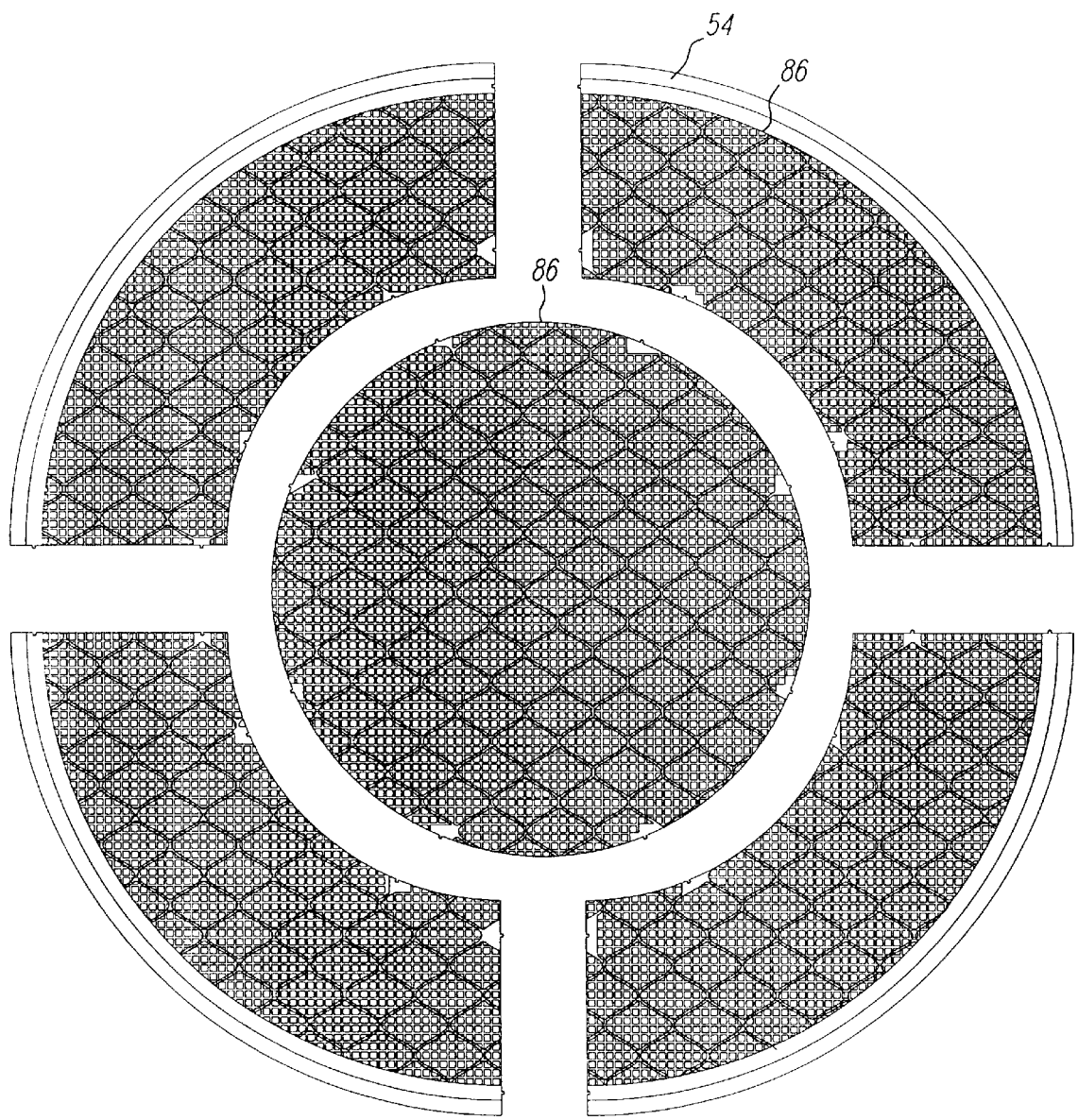
FIG. 14 is a plan view of a further embodiment using a circular format.
Figure 15:
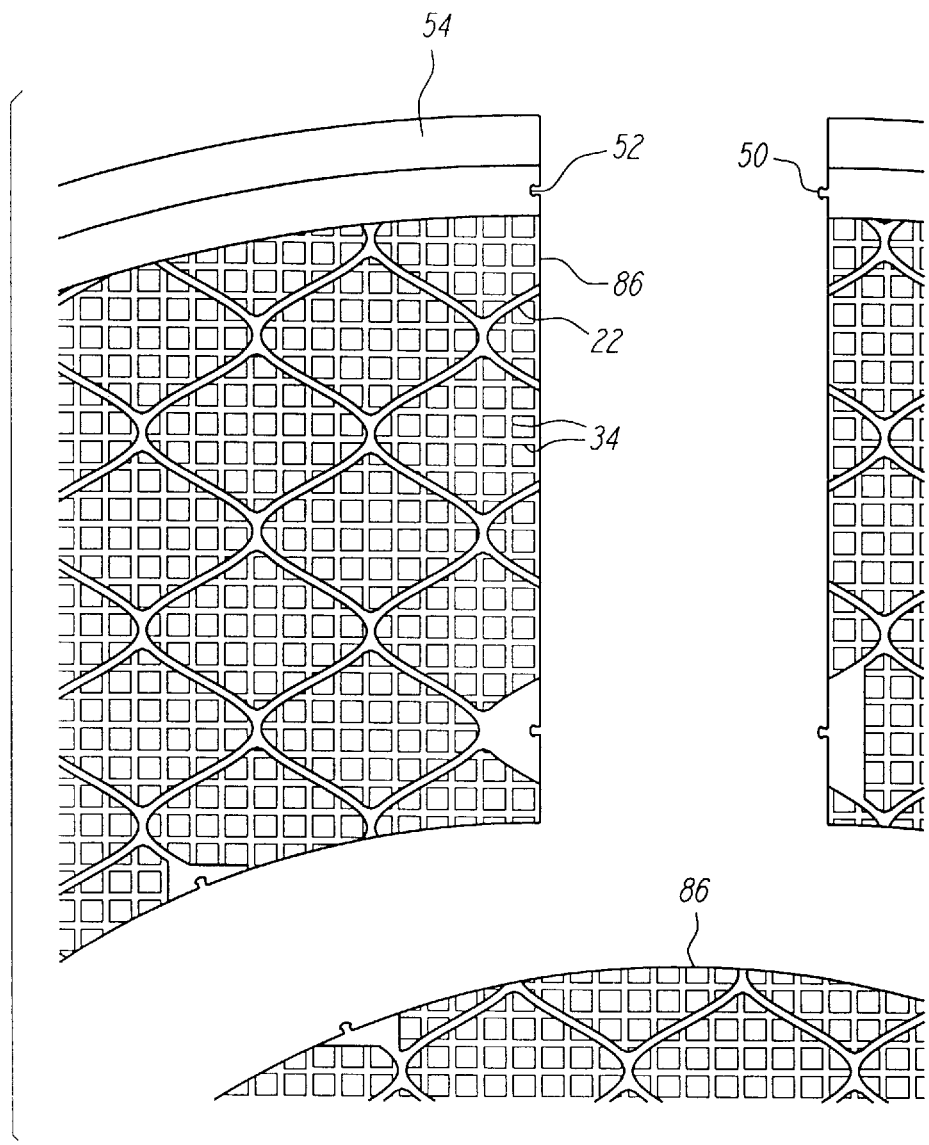
FIG. 15 is a detail of a portion of FIG. 14.
Figure 16:
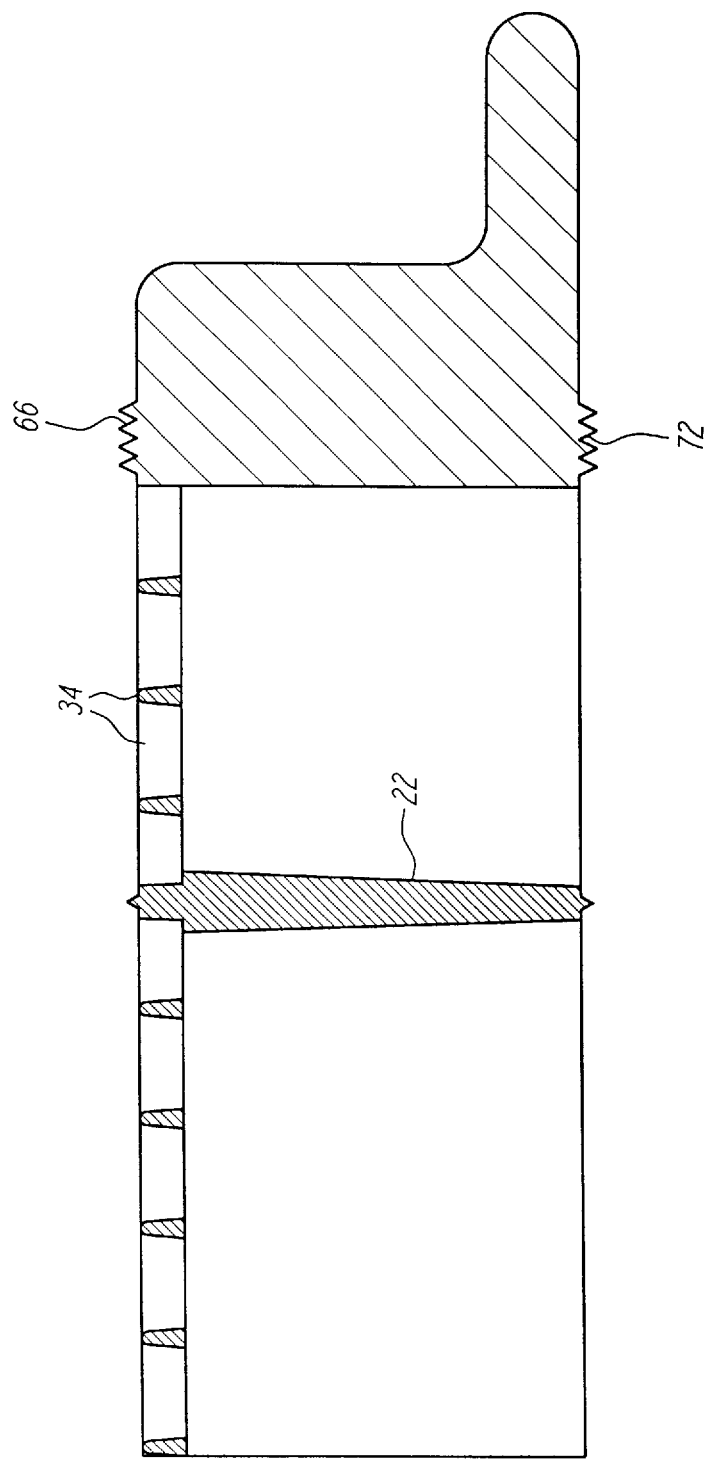
FIG. 16 is a cross-sectional view of the frame periphery of FIG. 14.

FIGS. 14–16 illustrate a circular support structure for a screen assembly. The supports 86 may be concentric and circular, full segments or a combination of truncated segments with inner segments or a circular center. Making the support structure with multiple supports 86 assists molding of thin cross sections for the grids. The remaining elements and mechanisms of the circular support structure and of the screen assembly with the screen cloth attached are contemplated to be the same as for the rectangular screen assembly.

Accordingly, strong, lightweight, disposable screen assemblies are presented. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A screen assembly comprising
   a planar support including a thin support grid having a support surface with apertures therethrough, the thin support grid being defined by elongate elements extending parallel to the support surface and joined together end to end, each elongate element having a rounded surface on one side, the rounded surfaces of the elongate elements defining the support surface;
   a screen cloth including interstices substantially smaller than the support grid extending across the support grid.

2. The screen assembly of claim 1, the rounded surfaces being defined by an ellipse in profile with the major axis of the ellipse being parallel to the support surface.

3. The screen assembly of claim 1, the support grid being rectilinear in plan.

4. A screen assembly comprising
   a planar support including a cell structure and a thin support grid, the cell structure having a mounting surface and walls defining open cells extending through the support, the walls extending in elongate cross section from the mounting surface, the support grid having a support surface and apertures therethrough which are substantially smaller than the open cells, the support surface being coplanar with the mounting surface;
   a screen cloth including interstices substantially smaller than the support grid and being affixed to the mounting surface.

5. The screen assembly of claim 4 further comprising
   multiple said supports, each support further including a periphery with the thin support grid having straight sides and the walls extending to the straight sides, the periphery including tenon and mortise elements on the walls at the straight sides extending perpendicular to the plane, the multiple said supports arranged with interlocking of the tenon and mortise elements to form a support body with straight sides defined by the thin support grids, the screen cloth being affixed to the mounting surfaces of the multiple said supports;
   a frame extending about the support body and including the tenon and mortise elements on the inner periphery of the frame and an attachment surface coplanar with the mounting surface, the screen cloth being attached to the attachment surface.

6. The screen assembly of claim 5, the screen cloth further including a peripheral edge, the frame further including two sets of attachment energy directors on the attachment surface and extending fully about the frame, a first of the two sets being fused into the screen cloth and a second of the two sets being fused into the peripheral edge of the screen cloth.

7. A screen assembly comprising
   a planar support including a thin support grid having a support surface with apertures therethrough, the thin support grid being defined by elongate elements extending parallel to the support surface and joined together end to end, each elongate element having a rounded surface on one side, the rounded surfaces of the elongate elements defining the support surface;
   a screen cloth including interstices substantially smaller than the support grid extending across the support grid;
   a frame extending about the cell structure and the thin support grid and including an attachment surface coplanar with the mounting surface, the screen cloth being attached to the attachment surface.

8. The screen assembly of claim 5, the screen cloth further including a peripheral edge, the frame further including two sets of attachment energy directors on the attachment surface and extending fully about the frame, a first of the two sets being fused into the screen cloth and a second of the two sets being fused into the peripheral edge of the screen cloth.

9. The screen assembly of claim 6, the cell structure further having energy directors on the mounting surface fused into the screen cloth.

10. A screen assembly comprising
    a planar support including a cell structure and a thin support grid, the cell structure having a mounting surface and walls defining open cells extending through the support, the walls extending in elongate cross section from the mounting surface, the support grid having a support surface and apertures therethrough which are substantially smaller than the open cells, the support surface being coplanar with the mounting surface;

a screen cloth including interstices substantially smaller than the support grid and being affixed to the mounting surface, the cell structure further having weld beads on the mounting surface fused into the screen cloth.

11. A screen assembly comprising a planar support including a cell structure and a thin support grid, the cell structure having a mounting surface and walls defining open cells extending through the support, the mounting surface having no straight edge in plan, the walls extending in elongate cross section from the mounting surface, the sunport grid having a support surface and apertures therethrough which are substantially smaller than the open cells, the support surface being coplanar with the mounting surface;

a screen cloth including interstices substantially smaller than the support grid and being affixed to the mounting surface.

12. The screen assembly of claim 11, the walls being sinusoidal in plan and joined with adjacent walls at the sinusoidal peaks having common tangents.

13. A screen assembly comprising a planar support including a cell structure and a thin support grid, the cell structure having a mounting surface and walls defining open cells extending through the support, the walls extending in elongate cross section from the mounting surface, the support grid having a support surface and apertures therethrough which are substantially smaller than the open cells, the support surface being coplanar with the mounting surface, the thin support grid being defined by elongate elements extending parallel to the support surface and joined together end to end, each elongate element having a rounded surface on one side, the rounded surfaces of the elongate elements defining the support surface;

a screen cloth including interstices substantially smaller than the support grid and being affixed to the mounting surface.

14. The screen assembly of claim 13, each elongate element having a flat surface on the side opposite from the rounded surface.

15. A screen assembly comprising a planar support including a cell structure and a thin support grid, the cell structure having a mounting surface and walls defining open cells extending through the support, the walls extending in elongate cross section from the mounting surface, the support grid having a support surface and apertures therethrough which are substantially smaller than the open cells, the support surface being coplanar with the mounting surface, the thin support grid being rectilinear in plan with the support surface being flat and defined by elongate elements joined together end to end with a ridge of each lying at the support surface;

a screen cloth including interstices substantially smaller than the support grid and being affixed to the mounting surface.

16. The screen assembly of claim 15, the elongate elements each having a rounded surface extending to the ridge.

17. The screen assembly of claim 16, the elongate elements each having a flat surface on the side opposite from the rounded surface.

18. A screen assembly comprising a planar support including a cell structure and a thin support grid, the cell structure having a mounting surface and walls defining open cells extending through the support, the walls extending in elongate cross section from the mounting surface, the support grid having a support surface and apertures therethrough which are substantially smaller than the open cells, the support surface being coplanar with the mounting surface;

a frame, the planar support further including a periphery with the thin support grid having straight sides and the walls extending to the straight sides, the frame being about the periphery.

19. A screen assembly comprising a planar support including a cell structure and a thin support grid, the cell structure having a mounting surface and walls defining open cells extending through the support, the walls extending in elongate cross section from the mounting surface, the support grid having a support surface and apertures therethrough which are substantially smaller than the open cells and being rectilinear in plan with the support surface being flat and defined by elongate elements joined together end to end with a ridge of each lying at the support surface, the support surface being coplanar with the mounting surface, the periphery of the planar support being defined by the thin support grid having straight sides and the walls extending to the straight sides, the periphery including tenon and mortise elements on the walls at the straight sides extending perpendicular to the plane;

a screen cloth including interstices substantially smaller than the support grid and being affixed to the mounting surface.

20. The screen assembly of claim 19 further including multiple said supports arranged with interlocking of the tenon and mortise elements to form a support body with straight sides defined by the thin support grids, the screen cloth being affixed to the mounting surfaces of the multiple said supports;

a frame extending about the support body and including the tenon and mortise elements on the inner periphery of the frame and an attachment surface coplanar with the mounting surface, the screen cloth being attached to the attachment surface.

21. The screen assembly of claim 20, the screen cloth further including a peripheral edge, the frame further including two sets of attachment energy directors on the attachment surface and extending fully about the frame, a first of the two sets being fused into the screen cloth and a second of the two sets being fused into the peripheral edge of the screen cloth.

22. The screen assembly of claim 21, the elongate elements each having a rounded surface extending to the ridge.

23. The screen assembly of claim 22, the mounting surface having no straight edge in plan.

24. A screen assembly comprising multiple planar supports each including a cell structure and a thin support grid, the cell structure having a mounting surface and walls defining open cells extending through the support, the walls extending in elongate cross section from the mounting surface, the support grid having a support surface and apertures therethrough which are substantially smaller than the open cells, the support surface being coplanar with the mounting surface, the supports being mutually attached to form a support body with straight sides defined by the thin support grids;

a frame extending about the support body and including an attachment surface coplanar with the mounting surface;

screen cloth including interstices substantially smaller than the support grid and being affixed to the mounting surface and the attachment surface.

25. The screen assembly of claim 24, the screen cloth further including a peripheral edge, the frame further including two sets of attachment energy directors on the attachment surface and extending fully about the frame, a first of the two sets being fused into the screen cloth and a second of the two sets being fused into the peripheral edge of the screen cloth.

26. The screen assembly of claim 24, the walls and the frame including weld beads extending from the mounting surface and attaching the screen cloth.

27. The screen assembly of claim 24, the supports and the frame both including tenons and mortises with the supports being mutually interlocked by the tenons and mortises and the frame being interlocked with the supports by the tenons and mortises.

28. A screen assembly comprising a planar support including a cell structure having a mounting surface and walls defining open cells extending through the planar support, the cell structure having no straight edge in plan and the walls being of substantially uniform width in plan;

a frame extending about the cell structure and fixed thereto;

a screen cloth fixed to the planar support at the mounting surface.

29. The screen assembly of claim 28, the screen cloth being fixed to the frame.

30. The screen assembly of claim 29, the frame including an attachment surface coplanar with the mounting surface.

31. The screen assembly of claim 30, the attachment surface being fused into the screen cloth.

32. The screen assembly of claim 28, the frame being a single formed unit with the planar support.

33. The screen assembly of claim 28, the mounting surface having weld beads fused into the screen cloth.

34. The screen assembly of claim 28 further comprising a thin support grid having a support surface with apertures therethrough, the grid being rounded into each aperture from the support surface.

35. A screen assembly comprising, a planar support including a cell structure having a mounting surface and walls defining open cells extending through the planar support, the walls extending in elongate cross section from the mounting surface; the cell structure having no straight edge in plan;

a frame extending about the cell structure and fixed thereto;

a screen cloth, the planar support at the mounting surface being fused into the screen cloth.

36. The screen assembly of claim 35, the walls being sinusoidal in plan and joined with adjacent walls at the sinusoidal peaks having common tangents.

* * * * *

UNITED STATES PATENT AND TRADEMARK OFFICE
CERTIFICATE OF CORRECTION

PATENT NO. : 5,851,393
DATED : December 22, 1998
INVENTOR(S) : CARR et al.

It is certified that error appears in the above-identified patent and that said Letters Patent is hereby corrected as shown below:

In claim 11 (col. 7, line 17), delete "sunport" and insert therefor -- support --.

Signed and Sealed this

Third Day of August, 1999

Attest:

Q. TODD DICKINSON

*Attesting Officer*   *Acting Commissioner of Patents and Trademarks*